Dec. 20, 1927.
R. CHILTON
PROPELLER MOUNTING
Filed Feb. 18, 1924
1,653,341
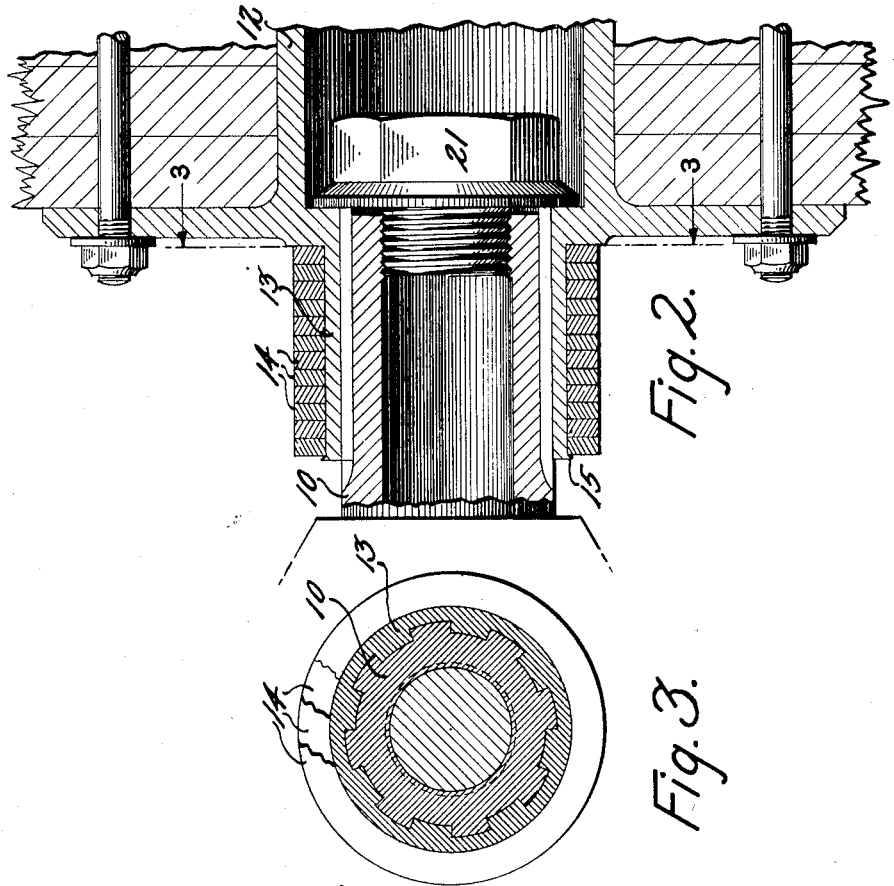
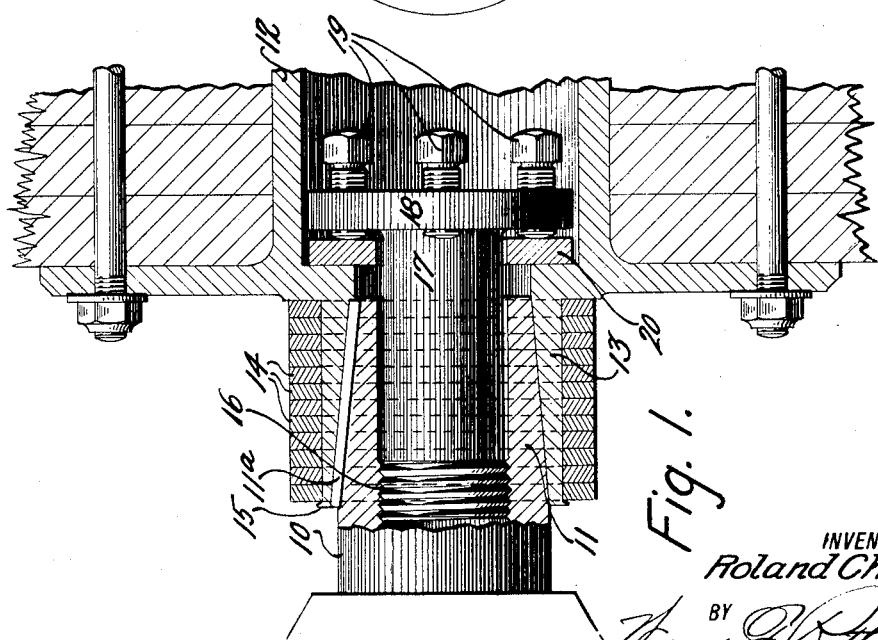
INVENTOR
Roland Chilton
BY
ATTORNEY Patented Dec. 20, 1927.

1,653,341

UNITED STATES PATENT OFFICE.

ROLAND CHILTON, OF KEYPORT, NEW JERSEY, ASSIGNOR TO AEROMARINE PLANE AND MOTOR COMPANY, INCORPORATED, A CORPORATION OF NEW YORK.

PROPELLER MOUNTING.

Application filed February 18, 1924. Serial No. 693,706.

This invention relates to improved means for attaching a member to a shaft for the transmission of rotary power. The invention is intended to be especially useful in connection with the attachment of members to shafts which are transmitting relatively high reversing torque loads and where accordingly there is appreciable torsional deflection in the shaft. In the attachment of driven members, such as propeller hubs to airplane crankshafts, for example, considerable difficulty has been experienced due to torsional deflections or twist in the shaft which tends to concentrate the drive on one end of the connection as usually made. One of the objects of the present invention is to afford a novel means whereby an equal axial distribution of driving pressure along a connection between a shaft and its hub member can be realized in defiance of torsional deflections in the shaft.

It will be appreciated that in the case where a relatively rigid hub member is fixed to a shaft, as by splines or taper connection, any torsional deflection in the shaft will have the effect of throwing the driving load on the end towards the driven side of the coupling. Actual experience has shown that when this action occurs, the end of the splines towards the power application side become loose, as the result of this concentration of load at the extreme end, while taper connections become "galled-up" due to the resulting relative motion at this point. This action is especially noticeable and destructive where reversing torque is applied to the attachment.

The invention consists in part in providing the driven member with a sleeve or hub formed so that said hub will acquire the same torsional flexibility under load as the shaft and arranging the sleeve so as to extend from the driven member on the power application side. Under these conditions the degree of twist in the shaft and in the sleeve will be equal and as a result, keys or splines will bear along their whole length, even when the parts are in twisted or torsionally deflected condition.

In the case of tapered connections where the drive is primarily frictional, the yield of the shaft within a relatively stiff hub member causes a concentration of all the driving load at the large end of the taper with the result that slipping must occur at this end before any load is taken by the frictional contact along the rest of the connection. This slipping under reversing torque conditions causes rapid "galling" of the connection.

As is well known to those versed in the art, the property of a section which determines its stiffness is its "polar moment of inertia" usually referred to as "I". For a solid shaft of diameter D this polar moment is $.0982 \times D^4$ and for a hollow member whose inside and outside diameters are $D^1$ and $D^2$ respectively, the value for the stiffness is $.0982 \times (D2^4 - D1^4)$. It will be seen that the stiffness increases in rapid ratio with the diameter so that a conventional hub of, for example, twice the diameter of its shaft has 16 times the stiffness, or in other words, under the same load the shaft will deflect under torque 16 times as much as such a hub, thereby immediately throwing all the load onto the driving end of the connection.

It should be noted that for substantially equal torsional deflection of a hub and a solid shaft formed of similar material, that the outside diameter of the hub should be $$\sqrt[4]{2} = 1.2$$

(approximately) X the diameter of the shaft. In other words, for a solid shaft of similar material, the wall thickness of the hub should not greatly exceed one-tenth the diameter of the shaft in order to obtain mutual torsional flexibilty which is one of the features of the invention.

This invention contemplates the use of a sleeve or hub member sufficiently thin to have substantially the same torsional yield as the shaft. In some cases, as where a multiple spline connection is used, such a thin sleeve is practicable, but when a taper or a single key connection is used such a thin sleeve would, by itself, have insufficient resistance to bursting; to obviate this objection however, the invention provides a means for preventing such bursting in connection with thin sleeves, or in other words, to provide a sleeve structure having great strength against bursting in combination with the desired torsional flexibility. This may be attained by reenforcing the outside of the sleeve or hub by a multiplicity of axially adjacent reenforcing bands, each one of which is free to move relative to its neighbor in torsional sense, so as not to interfere with the torsional deflection of the hub member upon which they are mounted.

In a tapered propeller hub fitting, a key is commonly used, but it is found that under reversing loads the key contributes very little to the tightness of the connection, the actual torque transmission being achieved by the friction of the tapered surfaces which should be drawn together under great pressure which is often attempted by the end pressure from a large annular nut, this method however, being open to the following objections:—

Investigation of the axial pressure obtainable by the use of the relatively large diameter fine pitch nut in common use for this purpose has shown that the maximum pressure exerted is undesirably low. This is on account of the low efficiency of a large diameter fine pitch nut bearing on a large annulus, which causes most of the effort put into tightening the nut to be lost in friction. With wrenches of proportions commonly used it has been found in practice that a greater pressure can be exerted with a relatively small bolt and nut than with the large diameter propeller hub nut in common use.

In order to overcome this deficiency of the large diameter nut, which is used in connection with the hollow shaft of the common airplane hub fitting, it has been the practice to mount the hubs on the shaft while hot so as to obtain the necessary high frictional contact between the hub and the shaft by radial shrinkage of the former instead of by end pressure from the nut, which is inadequate in the usual construction. This shrinking-on, however, is objectionable in that it makes disassembly of the parts extremely difficult.

A further object of the present invention is accordingly to provide a means for obtaining the relatively great axial pressure necessary to secure tightness in a taper fit, in a simple and efficient manner. This object of the invention is achieved in the construction of the showing by substituting for the conventional annular nut a multiplicity of relatively small diameter screws, each of which, as before stated, possess a relatively large pressure efficiency. This will be more fully described hereinafter.

A further difficulty in connection with taper fits especially when these are relatively long, has been that with the usual construction, the drive is found to be effective only at the small end of the taper, the large end not being in sufficiently tight contact. This is because there is some elastic extension of the shaft member under the relatively great end loads necessary, so that the thrust from the nut is taken at the small end of the taper instead of being effective over the whole length as is desired.

Attempts are frequently made to remedy this condition by specifying a small difference in taper between the shaft and the hub so that the contact will be towards the large end before the nut pressure is applied, whereupon the stretch in the shaft is intended to produce a fit over a substantial portion of the length. The necessary variations in size are minute and extremely hard to attain in manufacturing conditions.

It is accordingly a still further object of this invention to attain a uniform fit over the whole length of the taper when the shaft and hole are made of identical degree of taper, which condition can easily be produced commercially as by lapping the parts together or by grinding both at a standard setting on a suitable machine. This object of the invention is achieved by a construction whereby the reaction from the thrust of these tightening up screws is transmitted to the large end of the taper instead of being taken directly at the small end as in the prior art. This method as hereinafter more fully described, will provide a uniform fit and ample frictional contact over the entire surface.

In the drawings:—

Figure 1 is a longitudinal section illustrating a tapered form of propeller mounting.

Figure 2 is a sectional view similar to Fig. 1 and in which a multiple spline form of mounting is illustrated.

Figure 3 is a transverse section taken on the line 3—3 of Fig. 2, as looking in the direction indicated by the arrows.

In the present instance with reference to Fig. 1, 10 designates the hollow drive shaft of an engine having a tapered end portion 11 on which is mounted the propeller hub 12. This propeller hub is provided with a sleeve portion 13 extending away from the hub proper and toward the power application side. In the embodiment as herein shown and described as Fig. 1 the same degree of taper is provided within the sleeve as on the shaft end 11, and a key or spline 11$^a$ is shown in conjunction therewith, the use of which is optional.

As referred to in the foregoing this sleeve is so proportioned relative to the shaft as to provide therein substantially the same torsional flexibility as the shaft possesses. These relative proportions can readily be computed by those skilled in the art on the basis of the expression hereinbefore mentioned.

In so forming the sleeve portion 13 as to provide therein the desired torsional flexibility it necessarily becomes a rather light structure as compared to that of the conventional mounting. The resulting light structure which might be fully adequate in conjunction with the multiple spline type, however does not provide the desired factor of safety against bursting when the tapered form is used and to this end the present invention contemplates the use of a reenforcing means, one form of which is shown in the drawings by a series of annular members 14 mounted on the sleeve.

These annular members 14, preferably formed rectangular in cross section are snugly fitted upon the sleeve portion in contiguous relation with one another and in a manner so as to permit of relative motion therebetween and are adapted to take up some of the transverse tensional stresses to which the sleeve may be subjected under load. It will be readily understood that although these annular members provide the necessary tensile strength in the sleeve portion they do not hinder the torsional flexing thereof, this is due to the fact that with such a construction, relative rotative motion is possible between the members. A simple means for retaining the annular members on the sleeve is shown in Figs. 1 and 2, in which the edge of the sleeve 13 is slightly upset as at 15.

Various other reenforcing means may be employed to strengthen the sleeve, and it is considered that any such means which permits torsional deflection in the sleeve to a degree substantially equal to that of the shaft is within the scope of the invention.

With reference to the multiple screw means for providing adequate frictional contact in a taper fitting as hereinbefore mentioned, the shaft 10 may conveniently be screwthreaded internally toward or adjacent the large end of the taper as at 16 and a tension member or center bolt 17 inserted into the bore thereof, said member having screw threads to engage those in the shaft. This tension member is provided with a head or flange portion 18 into which a number of holes are tapped to receive the screws 19. Between the hub 12 and the flange portion 18 there is shown an annular ring 20, which may conveniently be hardened so as to provide a bearing for the ends of the screws 19, said ring also tending to distribute the screw pressure more evenly. It will be readily understood that when the screws 19 are advanced the hub 12 will be forced up on the tapered portion 11 of the shaft. The pressure which can be exerted by this means being extremely high as compared to the conventional method utilizing a single large annular nut.

When the screws are thus tightened the tension member will undergo elastic extension, but the shaft itself will be relieved of any stretching tendency, in fact the load on the shaft will be compressive along the tapered portion which will tend to bring the preponderance of pressure between the tapered engaging surfaces at the large end of the taper, thus one of the objects of the invention is achieved since that is the end at which the driving effort is applied and at which high frictional contact is desirable. It is found in practice that when the reverse condition, that is to say, preponderance of pressure at the small or anti-driving end of the taper obtains, the torsional yield of the shaft under driving loads causes relative motion between the shaft and the sleeve at the large end, which leads to serious scoring and other damage to the surfaces.

The use of other means than the center tension bolt 17 for obtaining the preponderance of pressure at the large end of the taper in defeat of distortion of parts is considered within the scope of this invention.

With reference to Figs. 2 and 3 there is shown a straight multiple spline connection in which the annular reenforcing members 14 are also employed. In this case the usual annular nut 21 is utilized, as great axial pressure is not found to be necessary.

While I have shown and described and have pointed out in the annexed claims certain novel features of my invention, it will be understood that various omissions, substitutions and changes in form and detail of the device illustrated and in its operation may be made by those skilled in the art without departing from the spirit of the invention.

Having thus described my invention, I claim:—

1. The combination with a drive shaft subject to torsional deflections, of a hub adapted for the mounting of a driven member, a flange integral with the hub for drivably securing said driven member thereto, and an integral sleeve extending away from the flange on the side remote from the hub to drivably engage the shaft and adapted to deflect congruently with the shaft under driving load.

2. In a shaft system having two portions secured together, a sleeve end and a shaft end extended on opposite sides from either portion towards the other and drivably engaged along their extended lengths, said sleeve having such thickness relative to the shaft that the torsional characteristics $D^4 - d^4$, wherein $D$ is the outside and $d$ the inside diameter, are substantially equal for the sleeve and the shaft.

3. The combination with a power shaft subject to torsional deflections, of a hub adapted for securing a driven member to the shaft and comprising, a flange and an integral sleeve extended from the side of the flange from which the power is applied and drivably engaging the shaft, said sleeve having a thickness relative to the shaft size such that the torsional characteristics $D^4-d^4$, wherein D is the outside and $d$ the inside diameter, are substantially equal for the sleeve and the shaft.

4. A hub having a sleeve portion drivably secured to a torsionally deflectable shaft, said sleeve having walls formed relatively thin and adapted for torsional deflection with said drive shaft, and reenforcing means comprising a plurality of elements mounted on the sleeve, said reenforcing means adapted to have relative rotative motion between its elements and to restrict radial expansion of the sleeve.

5. The combination with an elastic shaft having a known polar moment of inertia, of a hub having a sleeve portion drivably secured to the shaft, said sleeve having walls of a thickness providing therein a polar moment of inertia substantially equivalent to that of said shaft, and a plurality of reenforcing means disposed circumferentially of said sleeve adapted to restrain radial expansion thereof, said reenforcing means further adapted to have relative rotative motion to one another.

6. In a mounting for a driven member, the combination of a torsionally deflectable drive shaft, a hub member, said hub member provided with a sleeve portion secured to the shaft and extending along the shaft towards a source of power, said sleeve having walls of reduced thickness in which the necessary tensile strength has been sacrificed by said reduction to obtain torsional flexibility therein substantially equal to that of said shaft, and circumferential reenforcing means for said sleeve adapted to increase the tensile strength without restricting the torsional deflection thereof.

7. In a mounting for a driven member, the combination with a torsionally deflectable drive shaft having a known polar moment of inertia, of a hub member, said hub member provided with a sleeve portion secured to the shaft and extending along the shaft towards a driving means, said sleeve having walls formed relatively thin to the extent of where the polar moment of inertia will be synonymous to that of the shaft so as to provide therein torsional flexibility substantially equal to that of said shaft, and a plurality of reenforcing members for said sleeve adapted to restrain radial expansion thereof when subjected to abnormal stresses said reenforcing members further adapted to have relative torsional motion to one another on said sleeve.

8. In a propeller mounting or the like, the combination of a torsionally deflectable hollow drive shaft having a tapered portion, a hub member secured to the tapered portion and provided with a sleeve extending towards a source of power, said sleeve so constructed as to provide therein torsional flexibility substantially equal to that of said shaft, a plurality of reenforcing means for said sleeve adapted to restrain radial expansion thereof, said reenforcing means further adapted to have relative rotative motion to one another on said sleeve, a means extending within the hollow portion of the shaft and engaging the same at a point adjacent to the large portion of the taper, and multiple screw means associated with the last said means and adapted to engage the hub adjacent the small portion of the taper in a manner so as to axially advance the hub on the shaft by means of said screws.

9. In the art of forming a coupling of the class described between a driving and a driven member, the combination of a torsionally yieldable drive shaft, a driven member having a sleeve portion formed of material having torsional characteristics similar to that of the shaft and extending from the driven member on the power application side to circumferentially engage the shaft, said sleeve portion being adapted for torsional deflection with the shaft by having its wall thickness formed so as not to substantially exceed one-tenth of the diameter of the shaft.

10. In a driving connection, the combination of a hub having an integral torsionally yieldable sleeve member adapted to be secured to a deflectable drive shaft, and a multiplicity of contiguously arranged annular members mounted circumferentially on said sleeve and adapted to prevent radial expansion thereof.

11. In apparatus of the class described, the combination of a hollow elastic drive shaft having a tapered portion, a hub member having a sleeve portion adapted to fit on the tapered portion of the shaft, said sleeve portion extending from the hub on the power application side and adapted to torsionally yield with the shaft, a plurality of adjacent annular members axially arranged on the sleeve and adapted for relative rotative motion to one another on said sleeve, engaging means within the shaft adjacent the large portion of the taper, a tension member disposed partly within the shaft and adapted to mesh with said engaging means, a multiplicity of screw means associated with the tension member and adapted to engage the hub adjacent the small portion of the taper in a manner so as to effect an axial pressure on both the sleeve and the hub when said screws are advanced.

12. In a hub having a torsionally flexible sleeve subject to tensional stresses, a means for circumferentially reenforcing said sleeve comprising a plurality of axially arranged annular elements mounted on the exterior of the sleeve in a rotationally free manner so as to restrain radial expansion of the sleeve without opposing any tendency towards torsional deflection.

13. In a torsionally flexible sleeve, a means for circumferentially reenforcing said sleeve against bursting, comprising a plurality of axially adjacent annular members mounted on the sleeve and adapted to permit of relative rotative motion with one another on said sleeve.

14. In a driving connection, the combination of, a driven hub having an integral sleeve adapted for engagement with a torsionally flexible drive shaft, said sleeve having walls formed sufficiently thin so as to permit said sleeve to torsionally yield under load congruently with said shaft, and circumferential reenforcing means mounted on said sleeve in a rotationally free manner; said means being adapted to counteract radial tensional stresses in the sleeve without restricting the yielding thereof.

15. In a propeller mounting, the combination of a drive shaft of elastic material having a tapered end portion, a driven means disposed adjacent the end of the shaft and having a hub portion of a material similar to said shaft and mounted on the tapered portion thereof, the hub and the shaft of such relative proportions as to provide therein substantially equal torsional yield when stressed, and a means engaging the shaft adjacent the large portion of the taper and having a plurality of screws to engage the hub at the small portion of the taper for axially advancing and securing the hub on the shaft.

16. In the art of securing a hub member to a shaft, a taper on the shaft adapted to engage a taper in the hub, a multiplicity of screw means adapted to force the hub axially upon the shaft and means to avoid stretching of the shaft relative to the hub under the load exerted by said screw means.

17. In apparatus of the class described, the combination with a shaft having a tapered portion, of a hub member adapted to fit said tapered portion, screw means adapted to axially force the hub onto the shaft, and means including a tension member so disposed within the shaft that the reaction from said screw means is effective only at the large end of the shaft taper.

18. In the art of securing an airplane propeller hub to its drive shaft, mutually fitting tapers in the hub and on the shaft respectively, a member engaging the shaft, multiple screw means engaging the hub and coacting with said member for exerting a relatively great axial pressure tending to force the hub on the taper, said member so disposed that the action from said screw means takes effect substantially at the large end of the taper.

19. In a tapered fitting, a male member, a female member, means including a member engaging the interior of the shaft, and screw means coacting therewith for producing axial pressure to tighten the one member upon the other, said means adapted to transmit pressure to the shaft such as would tend to produce axial compression thereof.

20. In the art of securing a tapered bored hub to a tapered shaft, the combination of screw means engaging the hub, a tension element engaging the shaft adjacent the large end of the taper only and remote from said screw means; said tension element coacting with the screw means to axially advance the hub upon the shaft in a manner as to preclude tensional stresses in the shaft.

21. In apparatus of the class described, a hollow shaft having a tapered end, a hub member adapted to fit said tapered end, a tension member engaging at one of its ends said shaft adjacent the large end of the taper thereon and carrying at the other end of the tension member a multiplicity of screws adapted to exert an axial pressure for forcing the hub member tightly upon the tapered shaft.

22. In a propeller mounting, the combination with a drive shaft having a tapered portion, of a hub having a tapered bore corresponding to the taper of the shaft and adapted to be mounted thereon to frictionally engage the same, a means adapted to force the hub axially upon the shaft said means having an axially compressive action on the tapered portion of the shaft.

23. In the art of mounting a hub on a shaft, a drive shaft having a tapered portion, a hub having a tapered bore corresponding to the taper of the shaft and adapted to be mounted thereon to frictionally engage the same, a means including a multiplicity of screws adapted to force the hub axially upon the shaft, said means having an axially compressive action on the tapered terminal of the shaft.

24. In a device of the class described, the combination with a hollow drive shaft having a tapered portion, of a hub having a tapered bore corresponding to the taper of the shaft and adapted to be mounted thereon to frictionally engage the same, a means for securing the hub on the shaft comprising a member having a multiplicity of screws therein, one end of said member engaging the interior of the shaft adjacent to the large portion of the taper thereon, the other end of said member adapted to engage the hub adjacent to the small portion of the taper thereof by means of the screws to force the hub axially upon the shaft by the advancement of said screws.

25. In apparatus of the class described, a hollow shaft having a tapered portion, a hub having a bore of the same degree of taper as the shaft portion and adapted to be secured thereon by frictional engagement, a tension member engaging the interior of the shaft adjacent the large portion of the taper thereon, a plurality of screws in the tension member adapted to engage the hub adjacent the small end of the taper thereof in a manner so as to secure the hub on the shaft when said screws are advanced.

26. In the art of securing a driven member on a drive shaft, a hollow drive shaft having a tapered portion, screw threads within the shaft adjacent to the large portion of the taper thereon, a driven member having a tapered bore and adapted to be drivably secured to the shaft by frictional engagement therewith, a member having a head portion at one end and a screw threaded portion at the other end, said member adapted to be screw threaded into the shaft, a plurality of set screws in the head adapted to bear against the driven member in a manner so as to cause and maintain the frictional engagement of the driven member on the shaft when said screws are advanced.

27. In a propeller mounting, a hollow drive shaft having a tapered portion, screw threads within the shaft adjacent to the large portion of the taper thereon, a hub having a tapered bore and adapted to be drivably secured to the shaft by frictional engagement therewith, a member having a head portion at one end and a screw threaded portion at the other end, said member adapted to be screw threaded into the shaft, a ring member between the head and the hub adapted to bear against hub in a manner so as to cause and to maintain the frictional engagement of the hub on the shaft when said screws are advanced.

28. As an article of manufacture for attachment to a torsionally flexible drive shaft, a hub member having a tubular portion to engage the shaft, said tubular portion formed sufficiently thin to produce therein torsional flexibility substantially equal to that of the shaft, said tubular portion restricted against radial expansion by a series of circumferential supporting members.

Signed at Keyport in the county of Monmouth and State of New Jersey this 11th day of Feb'y A. D. 1924.

ROLAND CHILTON.